March 11, 1930.                F. EWIG                    1,750,095
                            HOLD FOR DREDGERS
                            Filed June 6, 1928
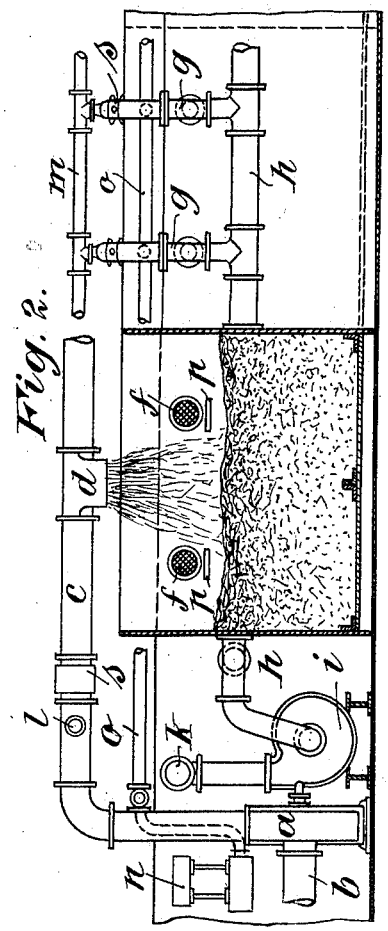
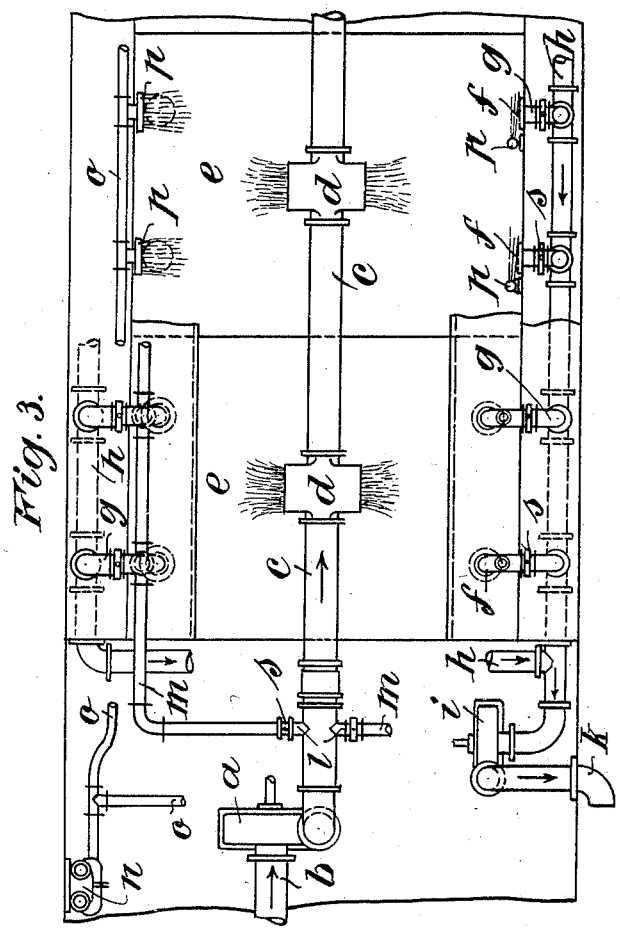
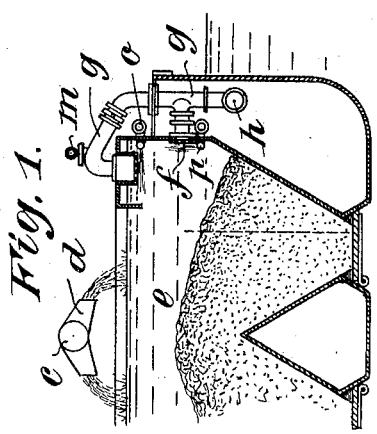
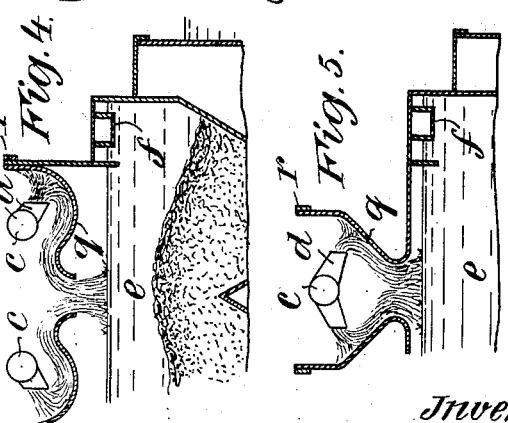
Inventor
Friedrich Ewig
by:
Watson, Coit, Morse & Grindle
Attorney.

Patented Mar. 11, 1930

1,750,095

UNITED STATES PATENT OFFICE

FRIEDRICH EWIG, OF BRUNSWICK, GERMANY

HOLD FOR DREDGERS

Application filed June 6, 1928. Serial No. 283,351.

Ships constructed as suction dredgers are provided with a hold into which the dredger material, mixed with water, is charged by means of a suction pump. After suitably filling the hold, the dredging operation is interrupted, the ship travels to so called dumping ground and there the hold is emptied by openings, bottom flaps, or in any other suitable manner.

A known disadvantage with such a dredger is that the hold is comparatively small so that the economy of the operation suffers. The latter is the case with the arrangement and method of operation hitherto usual. The mixture of water and dredged material is simply pumped into the hold, the dredged material being adapted to be deposited on the bottom thereof, whilst the water flows over the upper edge of the open hold, and flows overboard. The dredgers in use have in many cases a hold of 600 cubic meters capacity, whilst the pump plant delivers about 3000 cubic meters of the mixture per hour. Consequently the hold is filled with the dredged mixture in about 12 minutes, so that overflow now takes place. If pure coarse sand is delivered this readily settles in the hold so that with the overflowing water only so much sand flows out as to make the operation still economical. This however, is not the case when dealing with fine readily floating dredged material, which only settles with difficulty. Of this light earth a very high percentage flows overboard with the overflow water and with the above the numerical ratios it frequently takes many hours before sufficient earth has been deposited in the hold to make it worth while travelling to the dumping ground. A complete filling of the hold with an earth which is so difficult to deposit is in fact hardly imaginable as the depositing becomes more difficult as the level of earth in the hold rises, i. e. as the head of water above the layer of earth in the hold decreases.

According to the present invention, an economical operation, therefore a suitably rapid filling of the load, even when operating on light soil, is rendered possible. This result is adapted to be obtained by preventing the soil from flowing overboard with the overflow water, that is to say, that it is only possible for water to flow out of the hold whilst the soil remains therein.

According to the present invention the water which enters the hold in excess no longer passes out by overflowing but is conducted away through separate openings provided in the walls of the hold, these openings being closed by suitable fine meshed sieves. As by reason of the comparatively low level at which these openings may be provided the hydrostatic head, as the free area of the sieve is reduced by the particles of soil and the like which are deposited thereon, is generally not sufficient to allow sufficient water to pass through said sieves, the sieve openings are connected by a network of pipes to a separate pump which is set in operation when the water in the hold has risen to above the sieve openings, and the sieves no longer allow sufficient water to pass there through. This is the case when the water in the hold rises to such an extent that the overflow which is still provided for safety reasons (for example failure of the separate suction pump) would otherwise come into operation with this arrangement there is preferably also combined a separate device for the purpose of keeping the sieve surfaces as clean as possible and maintaining them at a high efficiency. For this purpose there is preferably provided a rinsing device, supplied by a separate pump, for the sieves, which removes deposits therefrom by spraying with water or if desired, with streams of air.

In the accompanying drawing the invention is illustrated by way of example.

Figs. 1–3 show a partial construction in cross section, longitudinal section and plan of a hold installation in a dredger.

Figs. 4 and 5 show details of modifications in partial cross sections.

The hold is provided in the usual manner with the bottom flaps for discharge purposes. The centrifugal pump $a$ conveys the mixture of water and dredged material in the known manner into the suction pipe $b$ and forces it through the pressure pipe $c$ over the hold into which it flows from the branch pipes $d$. According to Figs. 4 and 5 the mixture first passes into trough shaped (Fig. 4) or inclined guiding and distributing walls (Fig. 5) q by means of which the mixture is distributed more or less uniformly along the length of the hold and acquires a certain steadiness before reaching the water level in the hold. Above the guide walls q there is provided, for reasons of safety, the overflow r (Figs. 4 and 5).

Along the hold, in Fig. 1 in the side walls and in the deck are provided openings f closed by sieves, which by means of pipes g fitted with sliders or valves s, are connected on each side of the vessel to a connecting pipe h, which is in the form of a suction pipe leading to a separate centrifugal pump i, mounted in the engine room, of which the pressure pipe k (Figs. 2 and 3) is conducted to the outside of the vessel.

According to Figs. 2 and 3 there is provided in the engine room a further pump n which sucks water or air from outside the vessel, and of which the pressure pipe o is provided with branches leading to the sieve openings f and there terminating in spraying openings p adapted to the shape of the sieve, so that the sieve can be rinsed continuously or intermittently as may be desired.

To the transverse pipe l leading from the pressure pipe c of the main pump a, are also connected with the interposition of valves s, pipes m which are connected to the pipes g of the sieve openings f. With this arrangement it is possible when commencing the operation to fill the network of pipes g, h and if desired also the centrifugal pump i, by means of the main pump a. Preferably a valve is also provided in the pressure pipe c beyond the pipe l, as shown in Fig. 2, in order to ensure this filling operation, and the pipes g are also preferably provided with such valves s in order to enable the sieve openings f in the side walls of the hold or in the deck to be brought into operation alternately.

The hold is preferably divided into compartments by means of partitions. When these are filled in succession it is possible, by means of the pipes g, which can be shut off, to connect the separate compartments selectively to the collecting pipe h.

When commencing the dredging operation the main pump a first operates alone, so that the operation proceeds in the usual manner. The separate pump i is preferably started as soon as the level of the charge in the hold has risen above the lower sieve openings f so as to enable water to flow as soon as possible from the hold through the sieves which separate the light soil therefrom. The sieves at the middle come into operation as soon as the deposited dredged material fills the hold to above the level of the lower sieve openings. The sieve openings f, supported by the action of the suction pump i, convey such a quantity of water without dredged material, from the hold, that the latter is filled in a comparatively short time. In this manner the total efficiency of the dredger is increased to a considerable extent, as it no longer remains for hours at the point of operation in order finally to travel to the dumping ground after being completely loaded with considerable losses, and during which time a considerable amount of soil raised from the bottom of the water has been returned into the water where it is again deposited in an undesirable manner near the point of dredging unless carried away by strong currents. The costs incurred by the erection and operation of the separate pump plant for the removal of the water while filling the hold are of little importance in comparison with the acceleration and improvement obtained in the complete operation so that from an economical point of view the dredging operation is considerably improved even with light soil.

I claim:—

1. In a suction dredge for handling liquid having finely divided material in suspension therein, the combination with a hopper provided with sieve openings in the side walls thereof, of means for delivering the liquid and other material to said hopper, and a suction pump connected to said sieve openings for withdrawing the liquid whereby the finely divided material may be permitted to settle in said hopper.

2. In a suction dredge for handling liquid having finely divided solid matter in suspension therein, the combination with a hopper provided with sieve openings in the side walls thereof at such height that the hopper may be substantially filled with the solid material before the sieve openings are covered thereby, of means for delivering the liquid and solid matter to said hopper, and a suction pump connected to said sieve openings for withdrawing the liquid from the hopper at a point adjacent the surface of the liquid therein, whereby the finely divided matter may be permitted to gradually settle and accumulate in the hopper.

3. In a suction dredge for handling liquid having finely divided material in suspension therein, the combination with a hopper provided with sieve openings in the side walls thereof at different elevations above the bottom of said hopper, of means for delivering the liquid and other material to said hopper, and a suction pump connected to said sieve openings for withdrawing the liquid whereby the finely divided material may be permitted to settle in said hopper.

4. In a suction dredge for handling liquid having finely divided material in suspension therein, the combination with a hopper provided with sieve openings in the side and upper walls thereof, of means for delivering the liquid and other material to said hopper, and a suction pump connected to said sieve openings for withdrawing the liquid whereby the finely divided material may be permitted to settle in said hopper.

5. In a suction dredge for handling liquid having finely divided material in suspension therein, the combination with a hopper provided with sieve openings in the side walls thereof, of means for delivering the liquid and other material to said hopper, a suction pump connected to said sieve openings for withdrawing the liquid whereby the finely divided material may be permitted to settle in said hopper, and means operable during the operation of said pump for removing the finely divided material from the sieve openings.

6. In a suction dredge for handling liquid having finely divided material in suspension therein, the combination with a hopper provided with sieve openings in the side walls thereof, of means for delivering the liquid and other material to said hopper, a suction pump connected to said sieve openings for withdrawing the liquid whereby the finely divided material may be permitted to settle in said hopper, a plurality of conduits, each terminating adjacent one of said sieve openings, and means for supplying liquid under pressure to said conduits to remove the material from the sieve openings.

FRIEDRICH EWIG.